Figure 1:
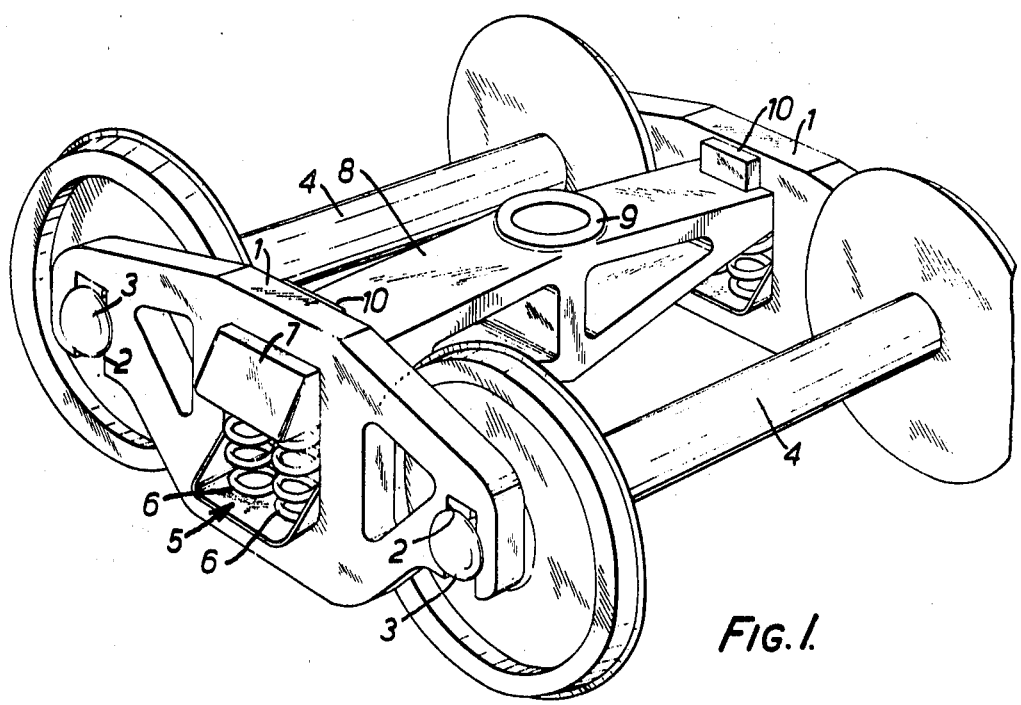

United States Patent

[11] 3,556,504

| [72] | Inventor | Frederick William Sinclair<br>Gloucester, England |
|---|---|---|
| [21] | Appl. No. | 746,685 |
| [22] | Filed | July 22, 1968 |
| [45] | Patented | Jan. 19, 1971 |
| [73] | Assignee | Gloucester Railway Carriage & Wagon<br>Company Limited<br>Gloucester, England |
| [32] | Priority | July 25, 1967 |
| [33] | | Great Britain |
| [31] | | 34,125/67 |

[54] SUSPENSION SYSTEMS
7 Claims, 8 Drawing Figs.

[52] U.S. Cl..................................................... 267/4,
267/1

[51] Int. Cl............................................. B61f 5/06
[50] Field of Search........................................ 267/4,
(C68)

[56] References Cited
UNITED STATES PATENTS

| 267,341 | 11/1882 | Godley.......................... | 267/4 |
| 775,271 | 11/1904 | Graham......................... | 267/4 |

*Primary Examiner*—James B. Marbert
*Attorney*—Young and Thompson

ABSTRACT: A spring unit for a vehicle suspension system, the unit comprising two springs so arranged that in the pretare condition they operate in series and in the gross load condition operate in parallel.

INVENTOR
FREDERICK WILLIAM SINCLAIR
BY Young & Thompson
ATTORNEYS

SUSPENSION SYSTEMS

This invention relates to suspension systems, and in particular to a spring unit for use in a vehicle suspension system and which provides a different spring rate in the tare and gross load conditions. The invention is more particularly, but not exclusively, applicable to the suspension systems of railway vehicles.

Lightweight railway goods vehicles are rapidly coming into use which travel at high speed and operate only in the tare or fully loaded conditions, and which have a rigid superstructure which does not twist to follow track undulations. With spring suspensions at present in use the provision of a spring rate to provide satisfactory suspension characteristics in the fully loaded condition precludes the provision of sufficient spring travel for the wheels to follow badly twisted track satisfactorily, and at the high operating speeds now being adopted this frequently results in derailment; it is also difficult to provide satisfactory suspension characteristics in the tare condition. The object of the invention is to provide a suspension spring unit which provides a different effective spring rate in the tare and gross load conditions, and also in what may be termed the "pretare" condition to enable the vehicle wheels to follow track undulations more satisfactorily. When there is a sudden dip in the track a wheel passing over the dip tends to become unloaded, and this is the condition referred to herein as the "pretare" condition.

According to the invention a spring unit for a vehicle suspension system comprises two springs so arranged that in the pretare condition they operate in series and in the gross load condition operate in parallel. Preferably only one of the springs is operative in the tare condition.

It is preferred that the two springs should be arranged coaxially one within the other with the outer ends of the springs (i.e. the ends at which the load is applied to the springs when operating in series) respectively engaging sprung and unsprung parts of the vehicle and the inner ends of the springs engaging abutments formed on relatively telescopic members which engage, to provide a maximum telescopic extension, when the springs are acting in series. The two telescopic abutment members may respectively engage the sprung and unsprung parts of the vehicle so as to be movable therewith when the springs are acting in parallel, and the arrangement is desirably such that only one of the telescopic members is so engaged in the tare condition so that only the corresponding spring is then operative.

Figure 2:
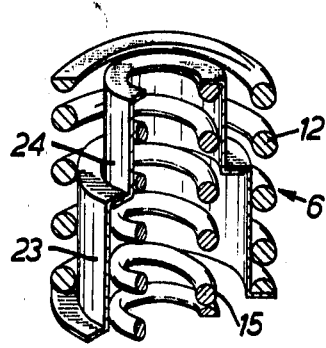
Figure 3:
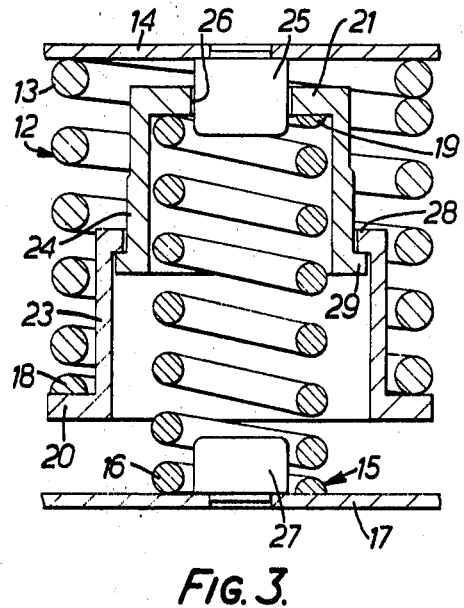
Figure 4:
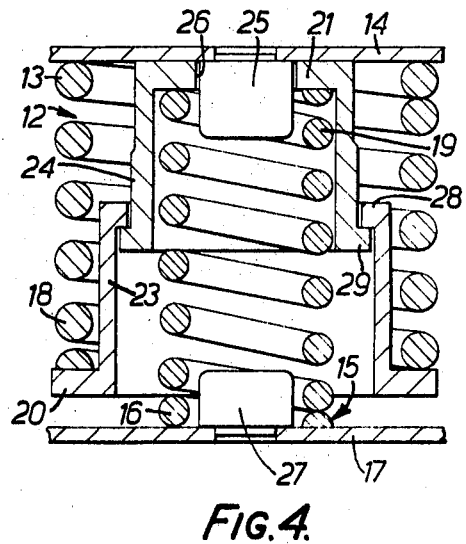
Figure 5:
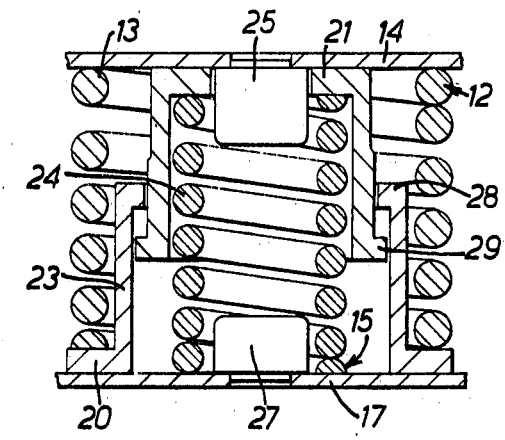
Figure 6:
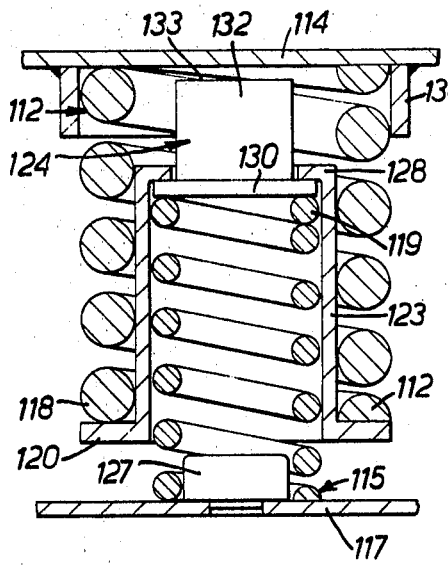
Figure 7:
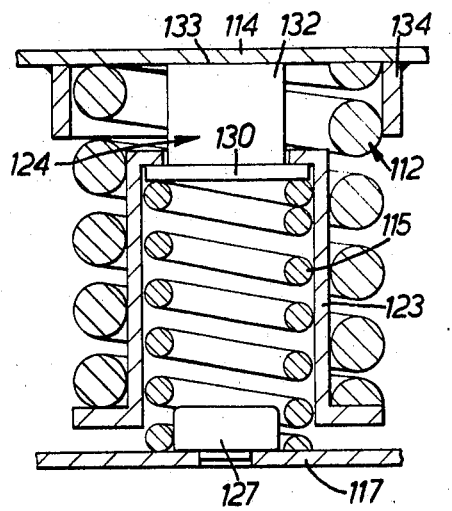
Figure 8:
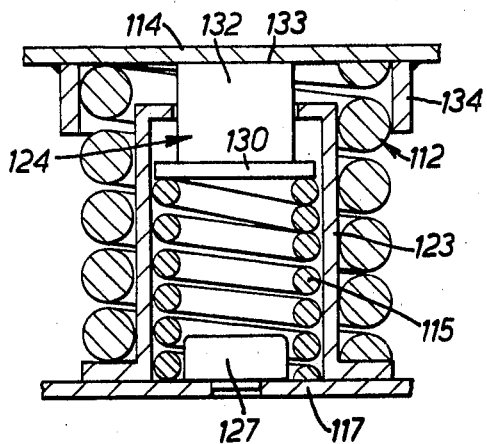

The invention will now be further described with reference to the accompanying drawings which show, by way of example, a railway vehicle bogie embodying the invention, together with a modified construction. In the drawings:

FIG. 1 is a perspective view of the bogie,

FIG. 2 is a perspective view, on a larger scale, of a spring unit of the bogie, with parts cut away, FIGS. 3, 4 and 5 are illustrative diagrammatic views showing in section the spring unit of the bogie under three different loading conditions, and FIGS. 6, 7 and 8 are respectively similar to FIGS. 2, 3 and 4, but show a spring unit according to the modified construction.

Referring to FIG. 1, the bogie has two side frames 1 with guides 2 supporting axle boxes 3 for the usual wheeled axles sets 4. Each side frame 1 has a central guide aperture 5 within which is supported, by a pair of spring units 6, a corresponding end 7 of a transverse bolster 8 which is guided for vertical movement within the aperture 5. The bolster 8 has a central pivot point 9 and two side bearers 10 for supporting the body or superstructure of the vehicle. The bolster 8 is supported by a corresponding pair of units 6 arranged side by side at each end, and as each unit 6 is identical, the following description refers to one such unit 6 only.

As shown in FIGS. 2 to 5 the unit 6 comprises two coaxial helical springs disposed one within the other in a nesting arrangement, namely an outer spring 12 the upper end 13 of which engages a spring pad 14 on the underside of the bolster 8 and an inner spring 15 the lower end 16 of which engages a spring pad 17 on the corresponding bogie side frame 1.

The lower end 18 of the outer spring 12 and the upper end 19 of the inner spring 15 respectively engage external and internal end flanges 20 and 21 formed on outer and inner telescopic abutment members 23 and 24 of generally hollow cylindrical form. A cylindrical guide block 25 projects from the upper spring pad 14 and passes through an end bore 26 in the inner telescopic member 24 and also projects a short distance into the upper end of the inner spring 15, and a similar cylindrical guide block 27 projects upwardly from the lower spring pad 17 and engages within the lower end of the inner spring 15. The members 23 and 24 engage by way of further internal and external end flanges 28 and 29 respectively, to limit the maximum telescopic extension when this extension is permitted by the vertical clearance between the corresponding spring pads 14 and 17 on the bolster 8 and side frame 1. This corresponds to a pretare condition as illustrated in FIG. 3 in which the two springs 12 and 15 act in series in the suspension sense and also act to maintain the maximum extension of the telescopic members 23 and 24. Thus the upper end 13 of the outer spring 12 and the lower end 16 of the inner spring 15 respectively form said "outer" ends of the springs at which the load is applied to the springs when operating in series.

As the spring loading increases one of the telescopic members 23 or 24 engages the corresponding spring pad 17 or 14 first, according to which of the springs 12 or 15 has the greater travel. In the present case this is the inner spring 15, and hence the inner telescopic member 24 first engages the spring pad 14 on the bolster 8 and further suspension movement compresses only the inner spring 15 which is alone operative, the outer spring 12 being compressed between the outer telescopic member 23 and the bolster 8 and merely serving to maintain the maximum extension of the telescopic members 23 and 24. This corresponds to the tare condition of the unit shown in FIG. 4 from which it will be seen that only the spring 15 is operative.

With further application of load, the flange 20 on the member 23 engages the pad 17 so that further load application cause the two flanges 28 and 29 to move out of engagement, whereupon the two springs 12 and 15 act on parallel, this corresponding to the gross loading condition which is illustrated in FIG. 5. Thus further load increase telescopes the abutment members and further compresses both springs so that they are operative in parallel.

The arrangement is in each case such that the inner spring 15 is operative alone over a range centered on the tare condition, and the springs 12 and 15 are operative in parallel over a range, limited by the maximum compression available, which is centered on the gross load condition. Thus a stepped three-rate overall spring characteristic is obtained which is extremely suitable for use with very rigid superstructures in which the suspension not only has to cater for the tare and gross load conditions of the vehicle but also operates as an antiderailing device to prevent any of the vehicle wheels becoming unloaded on a twisted railway track, thus leading to possible derailment. The described constructions achieve this while conserving space in restricted conditions, and a long travel suspension is provided with suitable low-frequency and acceleration characteristics in the pretare and tare conditions, together with minimum acceptable movement with suitable spring characteristics under gross load.

In the modified construction shown in FIGS. 6 to 8, parts corresponding to those of the arrangement of FIGS. 1 to 5 have been given the same reference numerals increased by 100, i.e. the spring 12 in FIGS. 1 to 5 corresponds to the spring 112 in the other FIGS. The modified construction employs an outer telescopic member 123 of similar form to that described, but the inner telescopic member 124 has a lower end flange 130 which engages a flange 128 on the outer telescopic member 123 and also provides an inner spring abutment. The member 124 has a cylindrical body 132 from which the flange 130 projects and which has an upper end 133 engageable with the upper spring pad 114 in the tare and gross load conditions, as shown in FIGS. 7 and 8 respectively. This arrangement for given overall dimensions enables a larger diameter of inner spring 115 to be used if this is found to be necessary. As before, in the pretare condition (FIG. 6) the two springs act in series, whereas in the tare condition only the inner spring 115 is operative and in the gross load condition the two springs 112 and 115 act in parallel. The upper end of the outer spring 112 is centralized by means of a short skirt portion 134 projecting downwardly from the pad 114, and such a feature may also be used in the construction shown in FIGS. 1 to 5.

I claim:

1. A spring unit for a vehicle suspension system and adapted to be mounted between sprung and unsprung parts of the vehicle, the unit comprising inner and outer springs disposed coaxially one within the other, and inner and outer telescopic abutment members each formed with a spring abutment and which interengage to define a maximum telescopic extension of said members, opposite outer ends of said springs being adapted respectively to engage said vehicle parts and the other ends of said springs respectively engaging the spring abutments of the telescopic members, whereby in a pretare condition of the vehicle said maximum telescopic extension of the abutment members results in the springs acting in series and in a gross load condition of the vehicle telescoping of the abutment members results in the two springs acting in parallel.

2. A spring unit according to claim 1, wherein the two telescopic abutment members are respectively adapted to engage the sprung and unsprung parts of the vehicle so as to be movable therewith when the springs are acting in parallel.

3. A spring unit according to claim 2, wherein one only of the telescopic abutment members is adapted to be engaged with one of said vehicle parts in the tare condition of the vehicle to render one of said springs alone operative in that condition.

4. A spring unit according to claim 1, wherein the outer telescopic abutment member has an external end flange against which the inner end of the outer spring bears and the inner telescopic member has an internal end flange against which the inner end of the inner spring bears.

5. A spring unit according to claim 1, wherein an inner end flange on the inner telescopic member provides the inner end abutment for the inner spring and also engages the outer telescopic member to define the maximum extension of the telescopic members.

6. A bogie for a rail vehicle and incorporating two spaced side frames with a transverse bolster each end of which is supported in the corresponding frame on a plurality of spring units each of which is in accordance with claim 1.

7. A spring unit according to claim 4, wherein the inner and outer telescopic members are each tubular and respectively have further end flanges which interengage to define the maximum extension of the telescopic members.